United States Patent
Alioli et al.

(10) Patent No.: US 12,460,974 B2
(45) Date of Patent: Nov. 4, 2025

(54) METHOD FOR ASCERTAINING THE TEMPERATURE OF A SUBSTANCE TO BE MEASURED, AND MEASURING SYSTEM FOR THIS PURPOSE

(71) Applicant: Endress+Hauser Flowtec AG, Reinach (CH)

(72) Inventors: Mattia Alioli, Binningen (CH); Vivek Kumar, Allschwil (CH); Alfred Rieder, Landshut (DE); Gerhard Eckert, Grenzach-Wyhlen (DE)

(73) Assignee: Endress+Hauser Flowtec AG, Reinach (CH)

( * ) Notice: Subject to any disclaimer, the term of this patent is extended or adjusted under 35 U.S.C. 154(b) by 387 days.

(21) Appl. No.: 18/006,437

(22) PCT Filed: Jun. 21, 2021

(86) PCT No.: PCT/EP2021/066756
§ 371 (c)(1),
(2) Date: Jan. 23, 2023

(87) PCT Pub. No.: WO2022/022890
PCT Pub. Date: Feb. 3, 2022

(65) Prior Publication Data
US 2023/0349771 A1    Nov. 2, 2023

(30) Foreign Application Priority Data
Jul. 29, 2020   (DE) ................. 10 2020 120 054.4

(51) Int. Cl.
*G01K 1/143*    (2021.01)
*G01F 1/34*    (2006.01)
(Continued)

(52) U.S. Cl.
CPC ............... *G01K 1/143* (2013.01); *G01F 1/34* (2013.01); *G01F 1/8427* (2013.01); *G01K 13/02* (2013.01)

(58) Field of Classification Search
CPC .......... G01K 1/143; G01K 13/02; G01K 7/42; G01F 1/34; G01F 1/8427; G01F 1/84; G01F 15/022; G01F 15/02; G01L 13/025
See application file for complete search history.

(56) References Cited

U.S. PATENT DOCUMENTS 4,768,384 A    9/1988 Flecken et al.
5,452,601 A *  9/1995 Hori ................. G01N 11/00
                                                  374/45

(Continued)

FOREIGN PATENT DOCUMENTS

CN     101711351 A  *  5/2010
CN     105698156 B     11/2017
(Continued)

OTHER PUBLICATIONS

Faruqui, A. A. et al., Velocity and temperature profiles of unstable liquid-liquid dispersions in vertical turbulent flow, Chemical Engineering Science, 1962, pp. 897-907, vol. 17, Pergamon Press Ltd., London.

(Continued)

*Primary Examiner* — Laura Martin
*Assistant Examiner* — Julia Fitzpatrick
(74) *Attorney, Agent, or Firm* — Christopher R. Powers; Endress+Hauser (USA) Holding, Inc.

(57) ABSTRACT

A method includes: determining a wall temperature of a wall enclosing a lumen of a flow line; determining a density, a viscosity, a thermal conductivity, a thermal capacity, and a pressure differential of a medium to be measured flowing in the line; determining a characteristic number value for the (Continued)

medium, which characterizes a heating of the medium flowing in the line as a result of dissipation and is a function of an Eckert number, a Prandtl number, and a pressure loss coefficient of the line as well as line-specific first, second and third exponents; and determining a temperature of the medium using the characteristic number value and the wall temperature. A measuring system for the method includes: a temperature sensor thermally coupled to a lateral surface of the wall and configured to generate a temperature measurement signal; and an operating electronic system electrically connected to the temperature sensor.

37 Claims, 4 Drawing Sheets

(51) Int. Cl.
*G01F 1/84* (2006.01)
*G01K 13/02* (2021.01)

(56) References Cited

U.S. PATENT DOCUMENTS

| | | | |
|---|---|---|---|
| 6,513,393 | B1 | 2/2003 | Eckert et al. |
| 6,558,036 | B2 | 5/2003 | Gysling et al. |
| 6,651,513 | B2 | 11/2003 | Wenger et al. |
| 7,040,179 | B2 | 5/2006 | Drahm et al. |
| 7,171,859 | B2 * | 2/2007 | Drahm ............ G01F 15/024 |
| | | | 73/861.356 |
| 7,406,878 | B2 | 8/2008 | Rieder et al. |
| 8,370,098 | B2 * | 2/2013 | Hocker ............ G01F 15/022 |
| | | | 702/50 |
| 8,671,776 | B2 | 3/2014 | Kumar et al. |
| 8,757,007 | B2 | 6/2014 | Anklin et al. |
| 8,924,165 | B2 | 12/2014 | Kumar et al. |
| 2008/0115577 | A1 | 5/2008 | Headrick |
| 2008/0127745 | A1 | 6/2008 | Kassubek et al. |
| 2011/0113896 | A1 | 5/2011 | Drahm et al. |
| 2017/0074701 | A1 | 3/2017 | Rieder et al. |
| 2017/0074730 | A1 | 3/2017 | Rieder et al. |
| 2020/0124452 | A1 | 4/2020 | Bitto et al. |

FOREIGN PATENT DOCUMENTS

| | | | | |
|---|---|---|---|---|
| CN | 105765352 | B | * 3/2020 | ............ G01F 1/684 |
| DE | 19858307 | A1 | * 6/2000 | ............ G01F 1/6847 |
| DE | 19859149 | A1 | 6/2000 | |
| DE | 102014103430 | A1 | 9/2015 | |
| DE | 102016112599 | A1 | 1/2018 | |
| DE | 102017106209 | A1 | 7/2018 | |
| DE | 102017219672 | A1 | * 8/2018 | |
| DE | 102017116505 | A1 | * 1/2019 | |
| DE | 102018132672 | A1 | 6/2020 | |
| EP | 919793 | A2 | 6/1999 | |
| EP | 1014061 | A1 | 6/2000 | |
| EP | 3087304 | B1 | * 8/2018 | ............ G01K 1/143 |
| EP | 3537124 | A1 | 9/2019 | |
| WO | 9508758 | A1 | 3/1995 | |
| WO | 0102816 | A2 | 1/2001 | |
| WO | 2009051588 | A1 | 4/2009 | |
| WO | 2009134268 | A1 | 11/2009 | |
| WO | 2012018323 | A1 | 2/2012 | |
| WO | 2012033504 | A1 | 3/2012 | |
| WO | 2012067608 | A1 | 5/2012 | |
| WO | 2012115639 | A1 | 8/2012 | |
| WO | WO-2014090691 | A1 | * 6/2014 | ............ G01F 1/684 |
| WO | 2015099933 | A1 | 7/2015 | |
| WO | 2017131546 | A1 | 8/2017 | |

OTHER PUBLICATIONS

Nyarko, P. R., Heat Load and its Effects on Fluid Friction Factor in Corrugated Pipes, 3(4), Am. J. of Sci. Indus. Res., pp. 241-251 (2012).

Yu, B., et al., Pressure Drop and Heat Transfer Characteristics of Turbulent Flow in Annular Tubes with Internal Wave-like Longitudinal Fins, vol. 40, Heat and Mass Transfer, pp. 643-651 (2004).

* cited by examiner

METHOD FOR ASCERTAINING THE TEMPERATURE OF A SUBSTANCE TO BE MEASURED, AND MEASURING SYSTEM FOR THIS PURPOSE

CROSS-REFERENCE TO RELATED APPLICATIONS

The present application is related to and claims the priority benefit of German Patent Application No. 10 2020 120 054.4, filed on Jul. 29, 2020, and International Patent Application No. PCT/EP2021/066756, filed Jun. 21, 2021, the entire contents of which are incorporated herein by reference.

TECHNICAL FIELD

The invention relates to a method for ascertaining a temperature of a substance to be measured, viz., a temperature of a measured substance conducted in a line, and to a corresponding measuring system.

BACKGROUND

US-A 2017/0074701, US-A 2017/0074730, WO-A 2017/131546, or WO-A 2015/099933 disclose measuring systems or methods for ascertaining a measured substance temperature, viz., a temperature of a measured substance, e.g., a gas, a liquid, or a dispersion, flowing in a line, e.g., a pipe, wherein a temperature of a typically metallic wall (wall temperature) surrounding the lumen of the line is detected on a surface facing away from the lumen (lateral surface) by means of one or more temperature sensors, and the measured substance temperature values representing the measured substance temperature are generated, e.g., viz., calculated, on the basis of temperature measurement signals generated therewith.

At least one of the temperature sensors of the particular measuring system is formed by means of temperature sensors, which are arranged outside the line and are therefore not contacted by the measured substance flowing in the lumen in the line during operation, and optionally also a coupling body, consisting, for example, of a thermal adhesive, which connects said temperature sensor to the wall in a thermally conductive manner. The temperature sensor is also configured to convert a wall temperature, corresponding to a temperature at a temperature measuring point formed by means of the in particular temperature sensor, into a corresponding temperature measuring signal, viz., an electrical measuring signal representing the particular wall temperature, e.g., with an electrical signal voltage dependent upon said wall temperature, and/or an electrical signal current dependent upon said wall temperature. The temperature sensor can accordingly be, for example, a platinum measuring resistor, a thermistor or a thermocouple, or also an electrical circuit formed by means of several such temperature-sensitive electrical or electronic components.

Each of the measuring systems described above further comprises measuring system electronics which are configured to receive at least one temperature measuring signal and to generate the measured substance temperature values using said temperature measuring signal. For this purpose, the measuring system electronics are typically electrically connected directly to the at least one temperature sensor by means of corresponding connecting lines. In the case of measuring systems used in industrial measuring and automation technology, the measuring system electronics are usually realized by means of one or more microprocessors, optionally also designed as digital signal processors (DSP), in such a way that the measuring system electronics determine the particular temperature measured values by numerically calculating digital sampling values obtained from the measurement signals, not least the at least one temperature measurement signal, and provide them in the form of corresponding digital values. In addition, the measuring system electronics are also typically accommodated within at least one comparatively robust, in particular impact-resistant, pressure-resistant, and/or weather-proof, electronics housing. The electronics housing can, for example, be arranged apart from the line, or can also be arranged in the immediate vicinity thereof, and possibly also fixed on the line. The particular measuring system electronics unit can also be electrically connected via corresponding electrical lines to a superordinate electronic data processing system which is arranged spatially remote from the particular measuring system and is also spatially distributed and to which the measurement values generated by the particular measuring system are passed on in a timely manner, e.g., also in real time, by means of at least one measurement value signal suitably carrying these measurement values. The data processing system can be formed, for example, by means of programmable logic controllers (PLC) and/or process control computers installed in a control room, and by means of corresponding data transmission networks—for example, a fieldbus system and/or a radio network. Further examples of measuring systems for ascertaining a measured substance temperature by means of temperature sensors arranged outside on a line conducting the measured substance are disclosed, inter alia, in EP A 919 793, US-A 2008/0127745, US-A 2008/0115577, US-A 2011/0113896, U.S. Pat. Nos. 4,768,384A, 7,040,179B, WO-A 95/08758, WO-A 01/02816, WO-A 2009/051588, WO-A 2009/134268, WO-A 2012/018323, WO-A 2012/033504, WO-A 2012/067608, or WO-A 2012/115639.

As in US-A 2017/0074701, US-A 2017/0074730, EP-A 919 793, US-A 2008/0127745, US-A 2008/0115577, US-A 2011/0113896, U.S. Pat. Nos. 4,768,384A, 7,040,179B, WO-A 95/08758, WO-A 01/02816, WO-A 2009/051588, WO-A 2009/134268, WO-A 2012/018323, WO-A 2012/033504, WO-A 2012/067608, or WO-A 2012/115639, measuring systems of the type in question can furthermore also be configured to determine at least one further measured variable of the measured substance flowing in the line which deviates from the measured substance temperature, in particular, viz., to generate measured values representing this variable. For example, such a measuring system can also be a vibronic measuring system that is useful for measuring one or more substance parameters of the measured substance, such as a density and/or a viscosity, and/or the measurement of one or more flow parameters of the measured substance, e.g., a mass and/or volume flow and/or a flow velocity, and consequently generates corresponding density measured values, viscosity measured values, mass flow measured values, volume flow measured values, and/or flow velocity during operation. The structure and mode of operation of such vibronic measuring systems, formed by means of the aforementioned measuring transducer of the vibration-type typically designed as a (metal) pipe and comprising a line—e.g., also designed as Coriolis mass-flow measuring devices, or also as Coriolis mass-flow/measuring systems, are known to a person skilled in the art and per se and are, for example, described extensively and in detail in US-B 65/133,393, U.S. Pat. Nos. 6,651,513B, 7,017,242B, 7,406, 878B, 8,757,007B, 8,671,776B, or 8,924,165B or also in the mentioned US-A 2017/0074701, US-A 2017/0074730, EP-A 919 793, US-A 2008/0127745, US-A 2008/0115577, US-A 2011/0113896, U.S. Pat. Nos. 4,768,384A, 7,040, 179B, WO-A 01/02816, WO-A 2009/051588, WO-A 2009/ 134268, WO-A 2012/018323, WO-A 2012/033504, WO-A 2012/067608, or WO-A 2012/115639. With such vibronic measuring systems, the line is also configured in particular to at least temporarily be vibrated while having the measured substance flow through for the purpose of measuring the material and/or flow parameter during operation. Typically, for this purpose, the line is actively excited to useful vibrations, viz., mechanical vibrations, about a static rest position associated with the particular line, by means of at least one vibration exciter of the measurement transducer acting thereupon in an electromechanical manner, formed for example by means of a permanent magnet affixed to the outside of the line, and by means of an exciter coil interacting therewith, especially also such mechanical vibrations as are suitable for inducing Coriolis forces in the flowing measured substance dependent upon its mass flow, and/or which are suitable for inducing frictional forces in the flowing measured substance dependent upon its viscosity, and/or which are suitable for inducing inertial forces in the flowing measured substance dependent upon its density. In order to detect mechanical vibrations of the line, and not least also their useful vibrations, the particular (vibronic) measuring system further comprises at least one, e.g., electrodynamic, vibration sensor which is configured to convert at least one vibration signal, viz., an electrical vibration measurement signal representing vibration movements of the line—for example, with an electrical signal voltage dependent upon a speed of the vibration movements of the line. The measuring system electronics of such vibronic measuring systems—not least for the above-described case in which the density measured values representing the density of the measured substance and/or viscosity measured values representing the viscosity of the measured substance can be generated—are further configured to also generate measured values using both the at least one temperature measurement signal and the at least one vibration signal, e.g., in such a way that the measuring system electronics determine density measured values and/or viscosity measured values based upon a useful frequency measured by the vibration signal, viz., a vibration frequency of the useful vibrations which is dependent upon the material parameter to be measured, and for this purpose also metrologically compensates for any dependence of the useful frequency on a momentary measuring fluid temperature. In addition to the evaluation of the temperature measurement signals and of the at least one vibration signal, the measuring system electronics of such vibronic measuring systems typically also serve to generate at least one, for example, harmonic and/or clocked driver signal for the at least one electromechanical vibration exciter. Said drive signal can, for example, be regulated with regard to a current intensity and/or a voltage level.

Further investigations have shown that measured substance temperature values determined by means of the aforementioned methods or measuring systems can differ considerably from the true or actual measured substance temperature, even at comparatively low flow velocities of the measured substance flowing in the line at about 0.1 m·s$^{-1}$ and/or given comparatively low Reynolds numbers of about 100 of the measured substance flowing in the line, e.g., in such a way that measured substance temperature values, which represent a core temperature of the measured substance corresponding to a temperature of a partial volume of the measured substance in the center of the lumen, can deviate more than 4K from said core temperature; this in particular also when taking into account heat flows detected by means of two or more temperature sensors within the wall and/or within an atmosphere enclosing the line—for example, according to the cited US-A 2017/0074701, US-A 2017/0074730, US-A 2008/0127745, U.S. Pat. No. 7,040, 179B, WO-A 2017/131546, or WO-A 2015/099933.

SUMMARY

To this end, it is an object of the invention to specify a method which allows a precise determination of a measured substance temperature of a measured substance flowing in a line, not least, specifically, a core temperature of the measured substance, based upon a measured wall temperature; this in particular also in the case of flow velocities of the measured substance flowing in the line of more than 0.1 m·s$^{-1}$, or in the case of Reynolds numbers of the measured substance flowing in the line of more than 100 and/or also in such a way that the determined measured substance temperature, or a measured substance temperature value representing this, deviates from the true measured substance temperature by less than 3 K, especially also less than 1 K. Moreover, a further object of the invention is to specify a measuring system suitable for executing such a method.

To achieve the object, the invention consists of a method for ascertaining a measured substance temperature $T_M$, viz., a temperature, in particular a core temperature, of a measured substance conducted in a line, in particular a tube, wherein the line has a lumen enclosed by an, especially metallic, wall, which method comprises:

letting the measured substance flow through the line in a predetermined flow direction—for example, at a flow velocity U of more than 0.1 m/s;

ascertaining at least one wall temperature $T_w$, viz., a wall temperature value $X_{Tw}$ representing a temperature of the wall—for example, on a surface, facing away from the lumen (lateral surface), of the wall, on a surface, facing the lumen (inner surface), of the wall, or within the wall;

ascertaining at least one density ρ of the density value $X_ρ$ representing the measured substance flowing in the line;

ascertaining at least one viscosity value $X_μ$, e.g., representing a viscosity μ—for example, an effective dynamic viscosity of the measured substance flowing in the line;

ascertaining at least one thermal conductivity value $X_λ$ representing a thermal conductivity λ of the measured substance;

ascertaining at least one heat capacity value $X_{cp}$ representing a specific heat capacity $c_p$ of the measured substance;

ascertaining at least one pressure differential $X_{Δp}$ representing a pressure differential Δp established within the measured substance flowing in the line in the flow direction, e.g., viz., a differential between a first static pressure p1 established in the flowing measured substance and a second static pressure p2 established downstream of the first static pressure p1 in the flowing measured substance;

using the at least one density value $X_ρ$, the at least one viscosity value $X_μ$, the at least one pressure differential value $X_{Δp}$, the at least one thermal conductivity value $X_λ$, and the at least one heat capacity value $X_{cp}$ for ascertaining at least one characteristic number value $X_V$ for a measured substance characteristic number V which characterizes heating of the measured substance flowing in the line caused by dissipation, e.g., in a partial volume of the flowing measured substance located close to the wall, wherein the measured substance characteristic number V corresponds to a calculation formula determined both by an Eckert number Ec of the measured substance flowing in the line, a Prandtl number Pr of the measured substance flowing in the line, and a pressure loss coefficient ζ of the line, as well as by a line-specific first exponent a, a line-specific second exponent b, and a line-specific third exponent c:

$$V = f(\Delta p, \rho, \mu, \lambda, c_p) = Pr^a \cdot Ec^b \cdot \zeta^c;$$

and using the at least one characteristic number value $X_V$ and the at least one wall temperature value $X_{Tw}$ for ascertaining at least one measured substance temperature value $X_{TM}$ representing the measured substance temperature $T_M$, e.g., the core temperature of the measured substance, such that measured substance temperature value $X_{TM}$ satisfies a calculation rule:

$$X_{TM} = X_{TW} - (k1 \cdot X_V + k2) = X_{TW} - X_{\Delta T}.$$

In addition, the invention also consists of a measuring system, e.g., a vibronic measuring system, which is configured to implement the method according to the invention, wherein the measuring system comprises a temperature sensor thermally coupled to a lateral surface of the wall for generating a temperature measurement signal following a change of a temperature $T_w$ of the wall, e.g., viz., a surface temperature of a hollow cylindrical segment of the wall, with a change of at least one signal parameter, e.g., viz., an electrical temperature measurement signal, as well as measuring and operating electronics electrically connected to the temperature sensor—for example, also formed by means of at least one microprocessor.

According to a first embodiment of the method according to the invention, it is further provided that the measured substance temperature value $X_{TM}$ satisfy a calculation rule dependent upon both the characteristic number value $X_V$ as well as the wall temperature value $X_{Tw}$, and parameterized by a line-specific first coefficient k1 and a line-specific second coefficient k2:

$$X_{TM} = X_{TW} - (k1 \cdot X_V + k2) = X_{TW} - X_{\Delta T}$$

In further developing this embodiment of the invention, the first coefficient k1 and the second coefficient k2 are previously determined (calibration) constants, and/or the first coefficient k1 is not less than 0.5 K (Kelvin) and no more than 1.5 K; and/or the second coefficient k2 is not less than −0.2 K and not more than 0.2 K—for example, is equal to 0.

According to a second embodiment of the method according to the invention, it is further provided that the first exponent a be more than 0.1 and less than 0.5—for example, 0.3.

According to a third embodiment of the method according to the invention, it is further provided that the second exponent b be more than 0.8 and less than 1.2—for example, 1.

According to a fourth embodiment of the method according to the invention, it is further provided that the third exponent c be more than 0.8 and less than 1.2—for example, 1.

According to a fifth embodiment of the method according to the invention, it is further provided that the second exponent b be equal to the third exponent c—for example, viz., equal to one.

According to a sixth embodiment of the method according to the invention, it is further provided that the parameter value $X_V$ satisfy a calculation rule:

$$X_V = \left(\frac{X_{cp}}{X_\lambda} \cdot X_\mu\right)^a \cdot \left(k3 \cdot \frac{2 \cdot X_{\Delta p}}{X_\rho \cdot X_{cp}}\right)^b.$$

In further developing this embodiment of the invention, the second exponent b is equal to one.

According to a seventh embodiment of the method according to the invention, it is further provided that the specific heat capacity $c_p$ of the measured substance be not less than $1 \text{ kJ} \cdot \text{kg}^{-1} \cdot \text{K}^{-1}$ and no more than $5 \text{ kJ} \cdot \text{kg}^{-1} \cdot \text{K}^{-1}$.

According to an eighth embodiment of the method according to the invention, the thermal conductivity λ of the measured substance is not less than $0.1 \text{ W} \cdot \text{m}^{-1} \cdot \text{K}^{-1}$ and not more than $1 \text{ W} \cdot \text{m}^{-1} \cdot \text{K}^{-1}$.

According to a ninth embodiment of the method according to the invention, it is further provided that the viscosity μ of the measured substance be greater than 1 mPa·s—for example, greater than 10 mPa·s.

According to a tenth embodiment of the method according to the invention, it is further provided that the density ρ of the measured substance be greater than $500 \text{ kg} \cdot \text{m}^{-3}$ and/or less than $2,000 \text{ kg} \cdot \text{m}^{-3}$.

According to an eleventh embodiment of the method according to the invention, it is further provided that the measured substance flowing in the line have a flow velocity U, e.g., average or greatest, which is greater than $0.1 \text{ m} \cdot \text{s}^{-1}$—for example, greater than $1 \text{ m} \cdot \text{s}^{-1}$.

According to a twelfth embodiment of the method according to the invention, it is further provided that the measured substance flowing in the line have a mass flow ṁ greater than $0.01 \text{ kg} \cdot \text{s}^{-1}$—for example, greater than $0.1 \text{ kg} \cdot \text{s}^{-1}$.

According to a thirteenth embodiment of the method according to the invention, it is further provided that the measured substance flowing in the line have a Reynolds number Re which is greater than 100—for example, greater than 1,000.

According to a fourteenth embodiment of the method according to the invention, it is further provided that the density value $X_\rho$ deviate from the (true) density ρ of the measured substance by not more than 0.5% of the density ρ ($f_\rho < 0.5\%$)—for example, by more than 0.1% of the density ρ ($f_\rho > 0.1\%$).

According to a fifteenth embodiment of the method according to the invention, it is further provided that the pressure differential value $X_{\Delta p}$ deviate from the (true) pressure differential Δp by not more than 15% of the pressure differential Δp ($f_{\Delta p} < 15\%$)—for example, by more than 5% of the pressure differential Δp ($f_{\Delta p} > 5\%$).

According to a sixteenth embodiment of the method according to the invention, it is further provided that the viscosity value $X_\mu$ deviate from the (true) viscosity μ of the measured substance by not more than 15% of the viscosity μ ($f_\mu < 15\%$)—for example, by more than 2% of the viscosity μ ($f_\mu > 2\%$).

According to a seventeenth embodiment of the method according to the invention, it is further provided that the thermal conductivity value $X_\lambda$ deviate from the (true) thermal conductivity λ of the measured substance by not more than 50% of the thermal conductivity λ ($f_\lambda < 50\%$)—for example, more than 5% of the thermal conductivity λ ($f_\lambda > 5\%$).

According to an eighteenth embodiment of the method according to the invention, it is further provided that the heat capacity value $X_{cp}$ deviate from the (true) specific heat capacity $c_p$ of the measured substance by no more than 50% of the specific heat capacity $c_p$ ($f_{cp}$<50%)—for example, by more than 5% of the specific heat capacity $c_p$ ($f_{cp}$>5%).

According to a nineteenth embodiment of the method according to the invention, it is further provided that the measured substance temperature value $X_{TM}$ deviate from the (true) temperature $T_M$, e.g., viz., the core temperature, of the measured substance by less than 2 K—for example, less than 1 K.

According to a twentieth embodiment of the method according to the invention, it is further provided that the wall temperature $T_w$ ($T_M$<$T_w$), be higher, e.g., by more than 1 K, than the temperature $T_M$ of the measured substance—for example, viz., a core temperature of the measured substance.

According to a twenty-first embodiment of the method according to the invention, it is further provided that the measured substance temperature value $X_{TM}$ be less than the wall temperature value $X_{Tw}$ ($X_{TM}$<$X_{Tw}$).

According to a twenty-second embodiment of the method according to the invention, it is further provided that the measured substance temperature value $X_{TM}$ represent a core temperature of the measured substance.

According to a twenty-third embodiment of the method according to the invention, it is further provided that the wall temperature value $X_{Tw}$ represent the temperature $T_w$, e.g., the surface temperature, of a hollow cylindrical segment of the wall.

According to a twenty-fourth embodiment of the method according to the invention, it is further provided that, for ascertaining the at least wall temperature value $X_{Tw}$, a surface temperature of the wall, e.g., viz., on a hollow cylindrical segment of the wall, be ascertained.

According to a twenty-fifth embodiment of the method according to the invention, it is further provided that the wall of the line consist of metal—for example, a steel, a titanium alloy, a tantalum alloy, or a zirconium alloy.

According to a twenty-sixth embodiment of the method according to the invention, it is further provided that the wall of the line have a wall thickness which is not less than 0.5 mm, e.g., more than 1 mm, and/or no more than 5 mm—for example, less than 3 mm.

According to a twenty-seventh embodiment of the method according to the invention, it is further provided that the line for ascertaining the density value, and/or for ascertaining the viscosity value, and/or for ascertaining the pressure differential value $X_{\Delta p}$ be made to vibrate, e.g., viz., actively excited to mechanically vibrate by means of an electromechanical vibration exciter of the Coriolis mass flow/density measuring device.

According to a first embodiment of the measuring system according to the invention, the measuring and operating electronics are further configured to ascertain at least one measured substance temperature value $X_{TM}$. Furthermore, the measuring and operating electronics can also be configured to ascertain the at least one wall temperature value $X_{Tw}$ and/or the at least one characteristic number value $X_V$ for the measured substance characteristic number V.

According to a first development of the invention, the method further comprises ascertaining a flow index n of the measured substance flowing in the line.

According to a second development of the invention, the method further comprises ascertaining at least one Reynolds number value $X_{Re}$ representing a Reynolds number Re of the measured substance flowing in the line. Furthermore, the pressure loss coefficient value $X_\zeta$ can therefore be calculated such that it satisfies a calculation rule:

$$X_\zeta = k41 + k42 \cdot X_{Re}^{k43}.$$

According to a third development of the invention, the method further comprises ascertaining at least one mass flow value $X_{\dot{m}}$ representing a mass flow $\dot{m}$ of the measured substance flowing in the line.

According to a fourth development of the invention, the method further comprises both ascertaining at least one Reynolds number value $X_{Re}$ representing a Reynolds number Re of the measured substance flowing in the line, as well as ascertaining at least one mass flow value $X_{\dot{m}}$ representing a mass flow $\dot{m}$ of the measured substance flowing in the line, and it is additionally provided that the pressure differential value $X_{\Delta p}$ satisfy a calculation rule:

$$X_{\Delta p} = k51 \cdot \frac{X_{\dot{m}}^2}{X_\rho} \cdot \left(k41 + k42 \cdot X_{Re}^{k43}\right)^{k52},$$

and/or that the Reynolds number value $X_{Re}$ satisfy a calculation rule:

$$X_{Re} = k62 \cdot \frac{X_{\dot{m}}}{X_\mu}.$$

According to a fifth development of the invention, the method further comprises ascertaining at least one velocity value $X_U$ representing a, for example, mean or largest flow velocity U of the measured substance flowing in the line. Furthermore, the pressure loss coefficient value $X_\zeta$ can therefore be calculated such that it satisfies a calculation rule:

$$X_\zeta = \frac{X_{\Delta p}}{0,5 \cdot X_\rho \cdot X_U^2},$$

and/or the characteristic number value $X_V$ can be calculated such that it satisfies a calculation formula:

$$X_V = \left(\frac{X_{cp} \cdot X_\mu}{X_\lambda}\right)^a \cdot \left(k_3 \cdot \frac{X_U^2}{X_{cp}}\right)^b \cdot \left(2 \cdot \frac{X_{\Delta p}}{X_\rho \cdot X_U^2}\right)^c.$$

According to a sixth development of the invention, the method further comprises using a Coriolis mass flow/density measuring device for ascertaining the density value $X_\rho$, and/or for ascertaining the viscosity value $X_\mu$, and/or for ascertaining the pressure differential value $X_{\Delta p}$. The line can accordingly also be a component of the Coriolis mass flow/density measuring device, for example.

According to a seventh development of the invention, the method further comprises using a pressure differential measuring device for ascertaining the pressure differential value $X_{\Delta p}$. The line can accordingly also be a component of the pressure differential measuring device, for example.

According to an eighth development of the invention, the method further comprises both ascertaining a first static pressure established in the flowing measured substance, and a second static pressure established in the flow direction downstream thereof in the flowing measured substance, as well as ascertaining the pressure differential value $X_{\Delta p}$ based upon the ascertained first and second static pressures.

According to a ninth development of the invention, the method further comprises both ascertaining the temperature $T_w$ of the wall, especially a surface temperature of a hollow cylindrical segment of the wall, as well as generating an, in particular electrical, temperature measurement signal following a change in said temperature $T_w$ with a change of at least one signal parameter.

According to a tenth development of the invention, the method further comprises using a temperature sensor thermally coupled to a lateral surface of the wall for generating the temperature measuring signal.

According to an eleventh development of the invention, the method further comprises using the temperature measurement signal for ascertaining the at least one wall temperature value $X_{Tw}$.

In a twelfth development of the invention, the measuring system comprises a vibration exciter for exciting mechanical vibrations of the line, as well as at least two vibration sensors for ascertaining mechanical vibrations of the line and for converting said vibrations into vibration signals. Furthermore, both the vibration exciter as well as the first and second vibration sensors can be electrically connected to the measuring system electronics, and the measuring system electronics can be configured to feed electrical power into the vibration exciter by means of an electrical excitation signal useful for causing mechanical vibrations of the line, as well as to receive and evaluate the vibration signals of the vibration sensors, e.g., viz., to digitize and/or ascertain the density value, and/or the viscosity value $X_\mu$, and/or the pressure differential value $X_{\Delta p}$, and/or the mass flow value $X_{\dot{m}}$, and/or the Reynolds number value $X_{Re}$ on the basis of the vibration signals or on the basis of the vibration signals as well as the electrical excitation signal.

According to a thirteenth development of the invention, the measuring system comprises first and second pressure sensors for ascertaining the pressure differential which are inserted in the wall of the line at a distance from one another in the direction of flow. Furthermore, both the first pressure sensor and the second can be electrically connected to the measuring system electronics, and the measuring system electronics can be configured to ascertain the pressure differential value $X_{\Delta p}$, e.g., viz., also the viscosity value $X_\mu$, and/or the velocity value $X_U$, by using pressure measurement signals, including digital ones for example, generated by means of the aforementioned pressure sensors.

A basic idea of the invention is to ascertain an (additional) heating of the measured substance flowing in the line by converting kinetic energy of the flowing measured substance into thermal energy due to friction processes within the measured substance flowing through the line, or between the flowing measured substance and the wall of the line, by means of further material and flow parameters of the measured substance, viz., its density, its viscosity, its thermal conductivity, its thermal capacity as well as the pressure differential, and to accordingly take it into account when ascertaining the measured substance temperature on the basis of the wall temperature.

BRIEF DESCRIPTION OF THE DRAWINGS

The invention as well as advantageous embodiments thereof are explained in more detail below based upon exemplary embodiments shown in the figures of the drawing. Identical or identically acting or identically functioning parts are provided with the same reference signs in all figures; for reasons of clarity or if it appears sensible for other reasons, reference signs mentioned before are dispensed with in subsequent figures. Further advantageous embodiments or developments, especially, combinations of partial aspects of the invention that were initially explained only separately, furthermore emerge from the figures of the drawing and/or from the claims themselves.

In particular.

DETAILED DESCRIPTION

Figure 1:
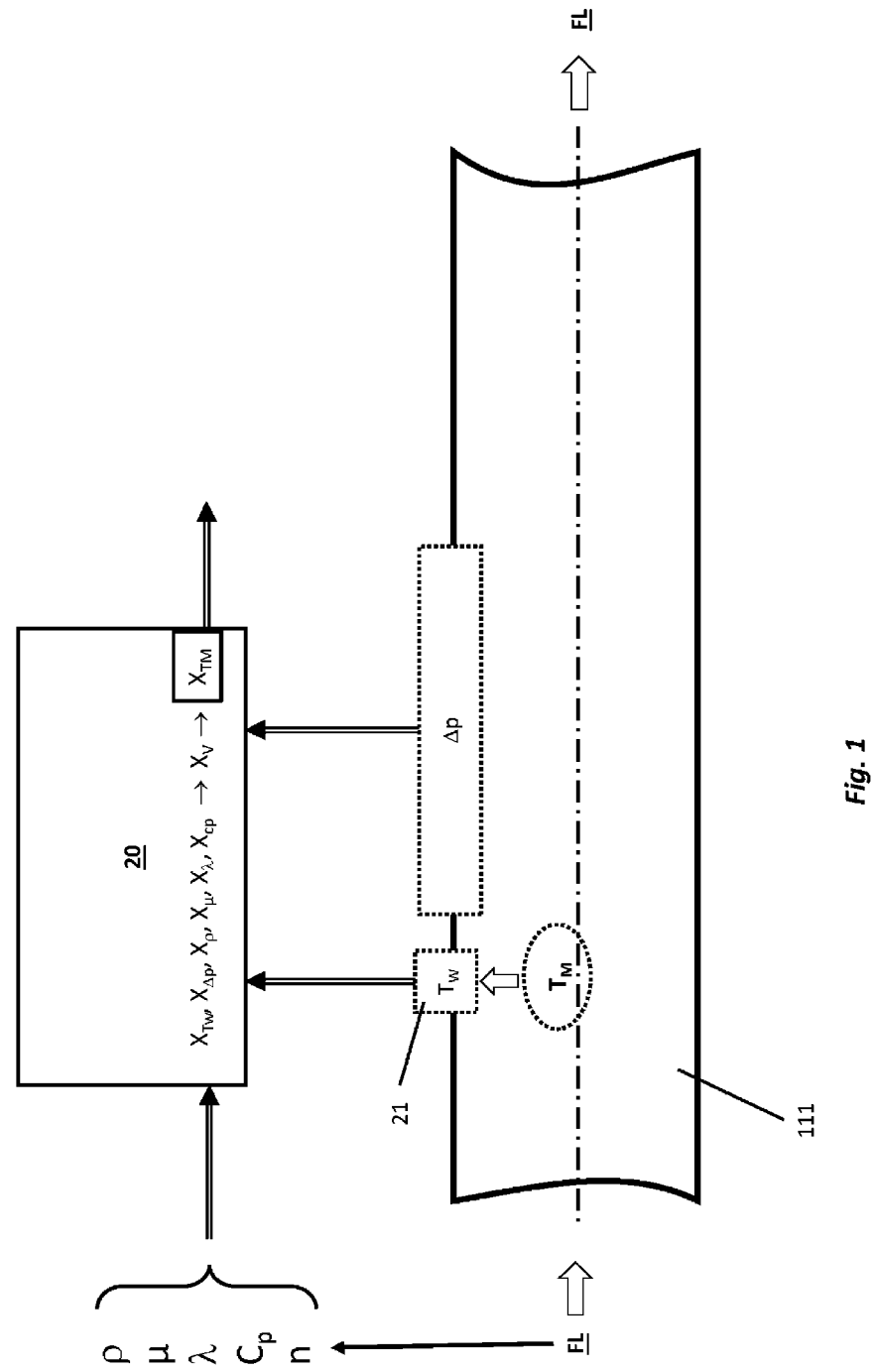
FIG. 1 schematically shows an exemplary embodiment of a measuring system according to the present disclosure for measuring a temperature of a fluid measured substance conducted in the line.
Figure 2:
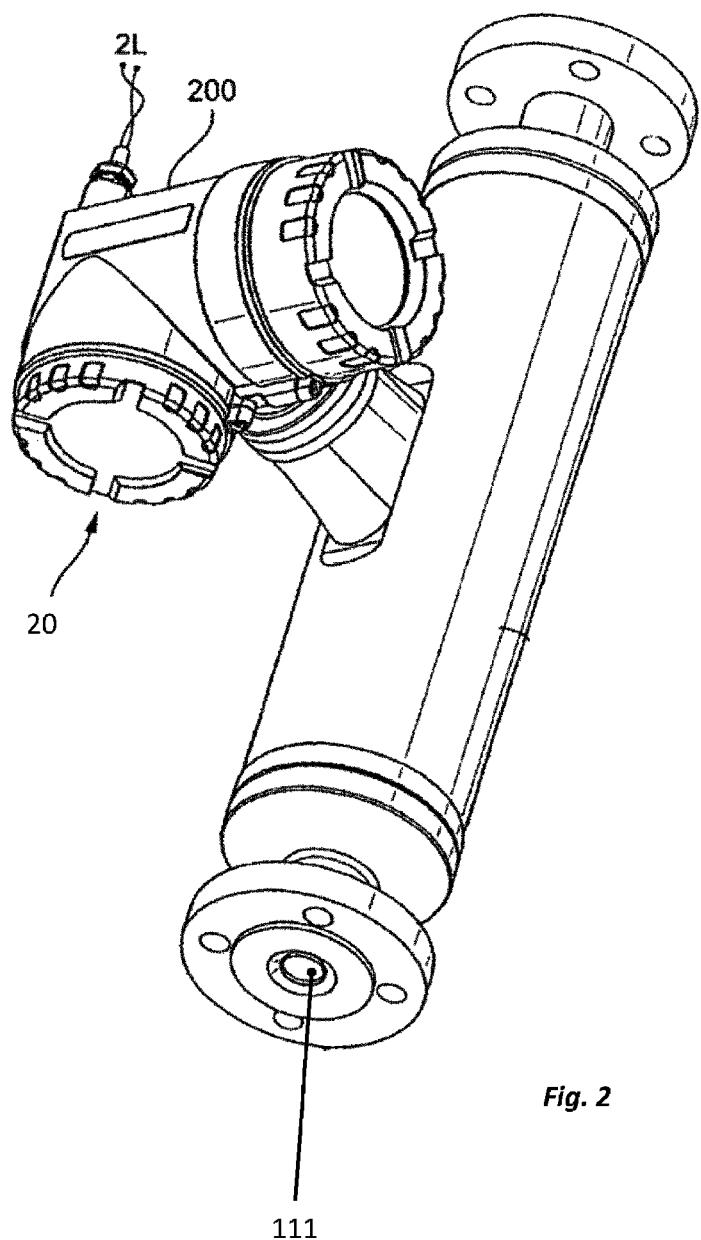
FIG. 2 shows a perspective view of an exemplary embodiment of a measuring system according to the present disclosure.
Figure 3:
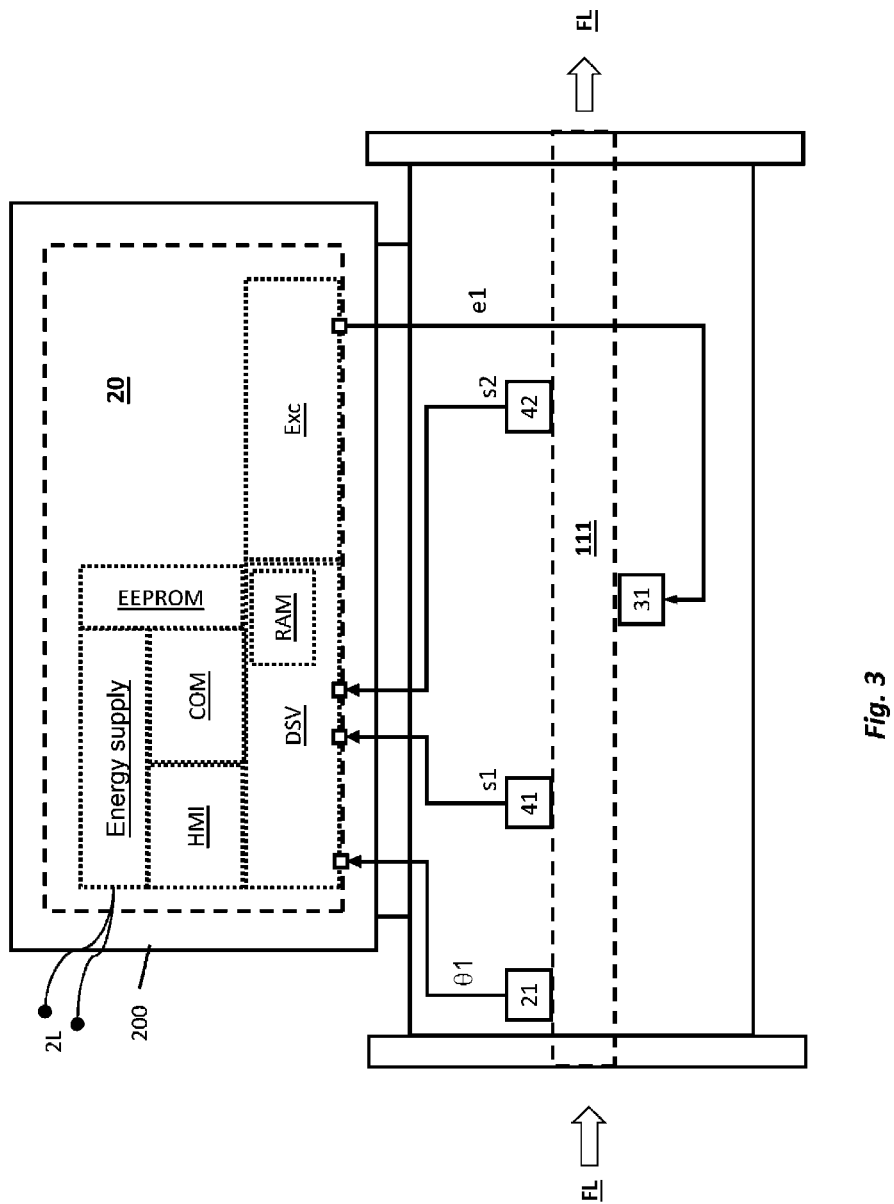
FIG. 3 schematically shows a variant of a measuring system according to the invention present disclosure according to FIG. 1.

FIGS. 1, 2, 3, and 4 each schematically show a measuring system having a (fluid) line or a corresponding (measuring) arrangement, which serves the purpose of ascertaining a measured substance temperature $T_M$, viz., a temperature of a fluid measured substance FL conducted in the line 111—for example, a gas, a liquid, or a dispersion. The line 111 has a lumen enclosed by a, for example, metal, wall and can be designed, for example, as a (metal) pipe. The measured substance temperature $T_M$ to be determined can, for example, be a core temperature of said measured substance that is located on a longitudinal axis of the lumen or in the vicinity thereof. According to one embodiment of the invention, the wall of the line consists of metal, e.g., a steel, a titanium alloy, a tantalum alloy, or a zirconium alloy, and/or the wall of the line has a wall thickness which is not less than 0.5 mm, e.g., also more than 1 mm, and/or no more than 5 mm—for example, also less than 3 mm. The line can further, for example, be a component of a (pipe) line system and/or of a measuring system useful for ascertaining the temperature $T_M$—for example, also a vibronic measuring system, and/or a measuring system that can be used within the length of a pipeline. Accordingly, the measuring system, as also shown in FIG. 2 or 3, can also be formed, for example, by one of the industrial measuring systems disclosed in the aforementioned EP-A 919 793, US-A 2008/0127745, US-A 2008/0115577, US-A 2011/0113896, US-A 2017/0074701, US-A 2017/0074730, U.S. Pat. No. 4,768,384A, US-B 65/133,393, U.S. Pat. Nos. 6,651,513B, 7,017,242B, 7,040,179B, 7,406,878B, 8,757,007B, 8,671,776B, 8,924,165B, WO-A 95/08758, WO-A 01/02816, WO-A 2009/051588, WO-A 2009/134268, WO-A 2012/018323, WO-A 2012/033504, WO-A 2012/067608, WO-A 2012/115639, WO-A 2015/099933, or WO-A 2017/131546, or also designed as a compact measuring device and/or as a vibronic measuring system, which in turn is correspondingly configured to conduct the measured substance or partial volume thereof during operation, or the line can be a component of a pressure differential measuring device, and/or a Coriolis mass flow measuring device, especially also a Coriolis mass flow/density measuring device, a Coriolis mass flow/density/viscosity measuring device, a Coriolis mass flow/seal/pressure differential measuring device, or a Coriolis mass flow/seal/viscosity/pressure differential measuring device.

To ascertain the measured substance temperature $T_M$, the measured substance is, according to the invention, provided by the line in a predetermined flow direction, e.g., with a flow velocity U of more than 0.1 m/s, and/or with a mass flow ṁ greater than 0.01 kg·s$^{-1}$, and, as shown schematically in FIG. 1, a wall temperature value $X_{T_W}$ that is for example also digital and represents at least one wall temperature $T_w$, viz., a temperature of the wall, is ascertained. The wall temperature $T_w$ to be ascertained can, for example, be a surface temperature, viz., a temperature of the wall on a surface, facing away from the lumen (lateral surface), of the wall, or for example a temperature within the wall, or a temperature on a surface (inner surface), facing the lumen, of the wall. Alternatively or in addition, the wall temperature $T_w$ to be ascertained can for example also be the (wall) temperature of a hollow cylindrical segment of the wall of the line. Accordingly, the wall temperature value $X_{T_W}$ represents, according to a further embodiment of the invention, the wall temperature $T_w$, e.g., viz., the surface temperature, of a hollow cylindrical segment of the wall and/or, to ascertain the at least wall temperature value $X_{T_W}$ according to a further embodiment of the invention, a surface temperature of the wall is ascertained. According to a further embodiment of the invention, it is furthermore provided that the wall temperature $T_w$, e.g., viz., the surface temperature of the wall and/or the temperature at a hollow cylindrical segment of the wall, be ascertained by means of a temperature sensor 21, and converted into a, for example, electrical, temperature measurement signal θ1 following a change of said (wall) temperature with a change of at least one signal parameter, especially also, viz., to also use said temperature measurement signal θ1 for ascertaining the at least one wall temperature value $X_{T_W}$. In particular, it is further provided for this purpose that a temperature sensor thermally coupled to a lateral surface of the wall, e.g., viz., attached to the wall by material bonding or friction bonding, be used for generating the temperature measurement signal θ1.

Unavoidable friction processes within the measured substance flowing through the line, or also between the flowing measured substance and the wall of the line, lead to the fact that kinetic energy of the flowing measured substance is converted into thermal energy, and therefore, by dissipation, (additional) heating is generated of the measured substance flowing in the line, e.g., viz., in a partial volume of the flowing measured substance located close to the wall; and this regularly in such a way that a temperature difference is established along one and the same radius of the line between the wall temperature and the measured substance temperature, and/or the wall temperature $T_w$ is higher than the measured substance temperature $T_M$ ($T_M$<$T_w$) actually to be measured. Not least for the case described above, where the measured substance temperature $T_M$ to be ascertained is a core temperature of the measured substance, the aforementioned dissipation can cause this to actually be more than 1 K less than the (measured) wall temperature $T_w$. The aforementioned friction processes can also be particularly pronounced, inter alia, when the measured substance flowing in the line has a flow velocity U that is greater than 0.1 m·s$^{-1}$, especially greater than 1 m·s$^{-1}$, and/or when the measured substance flowing in the line has a mass flow ṁ greater than 0.01 kg·s$^{-1}$, e.g., also greater than 0.1 kg·s$^{-1}$, and/or when the measured substance FL flowing in the line has a Reynolds number Re which is greater than 100, especially, viz., also greater than 1,000. The Reynolds number Re of the measured substance flowing in the line is a dimensionless parameter for fluids, which is known to be defined as a ratio between inertial and viscous forces in the flowing fluid and which, inter alia, also corresponds to a calculation formula that depends upon a characteristic length L or A:

$$Re = \frac{\rho \cdot U \cdot L}{\mu} = \frac{\dot{m}}{A \cdot \mu}. \tag{1}$$

Furthermore, the aforementioned friction processes could also be observed in particular with such measured substances in which a specific heat capacity $c_p$ is not less than 1 kJ·kg$^{-1}$·K$^{-1}$, and/or in which thermal conductivity λ is not less than 0.1 W·m$^{-1}$·K$^{-1}$, and/or in which a viscosity is μ greater than 1 mPa·s, especially, viz., greater than 10 mPa·s, and/or in which a density ρ is greater than 500 kg·m$^{-3}$.

To ascertain the measured substance temperature $T_M$ according to the invention, taking into account the aforementioned friction processes or the associated dissipation, additionally at least one density value $X_\rho$ representing a density ρ of the measured substance flowing in the line is ascertained, along with at least one viscosity value $X_\mu$ representing a viscosity μ, especially an effective dynamic viscosity, of the measured substance flowing in the line, at least one thermal conductivity value $X_\lambda$ representing the thermal conductivity λ of the measured substance, at least one heat capacity value $X_{cp}$ representing a specific heat capacity $c_p$ of the the measured substance, as well as at least one pressure differential value $X_{\Delta p}$ representing a pressure differential Δp established within the measured substance flowing in the line in the flow direction, especially, viz., a differential between a first static pressure p1 established in the flowing measured substance and a second static pressure p2 established downstream of the first static pressure p1 in the flowing medium. The viscosity μ of the measured substance can generally also be defined or ascertained, e.g., as an effective viscosity μ, in such a way that it corresponds to a calculation formula depending upon a consistency K of the measured substance flowing in the line, a shear velocity $\dot{\gamma}$ of the measured substance flowing in the line, and a flow index n of the measured substance flowing in the line:

$$\mu = K \cdot \dot{\gamma}^{n-1} \cdot \left(\frac{3n+1}{4n}\right)^n \cdot 8^{n-1}, \tag{2}$$

wherein the consistency K of the measured substance flowing in the line is in turn defined as a ratio between a shear stress τ in the measured substance and a shear velocity $\dot{\gamma}$ in the measured substance, and therefore corresponds to a calculation rule:

$$K = \frac{\tau}{\dot{\gamma}}. \tag{3}$$

The aforementioned density values $X_\rho$, viscosity values $X_\mu$, thermal conductivity values $X_\lambda$, heat capacity values $X_{cp}$, and/or pressure differential values $X_{\Delta p}$ can for example also be digital values or digital measured values. For the aforementioned case, where the measuring system is formed by a Coriolis mass flow measuring device or is designed as a component of such a Coriolis mass flow measuring device, said Coriolis mass flow measuring device can also be configured to ascertain the aforementioned density value $X_\rho$, and/or the Coriolis mass flow measuring device can be configured to ascertain the aforementioned viscosity value $X_\mu$, and/or the Coriolis mass flow measuring device can be configured to ascertain the aforementioned pressure differential value $X_{\Delta p}$. The use of such a measuring system also has, inter alia, the advantage that the density value $X_\rho$ can be determined so precisely that it deviates from the (true or actual) density ρ of the measured substance by not more than 0.5% of the density ρ ($f_\rho$<0.5%), or the pressure differential value $X_{\Delta p}$ can be ascertained so precisely that it deviates from the (true or actual) pressure differential Δp by not more than 15% of the pressure differential Δp ($f_{\Delta p}$<15%), and/or the viscosity value $X_\mu$ deviates from the (true or actual) viscosity μ of the measured substance by not more than 15% of the viscosity μ ($f_\mu$<15%). For the other cited case in which the measuring system is formed by means of a pressure differential measuring device or is designed as a component of such a pressure differential measuring device, said pressure differential measuring device can also be used, for example, alternatively or in addition to the aforementioned Coriolis mass flow measuring device to ascertain the pressure differential value $X_{\Delta p}$. The use of such a measuring system also has, inter alia, the advantage that the pressure differential value $X_{\Delta p}$ can be determined so precisely that it deviates from the (true or actual) pressure differential Δp by not more than 5% of the pressure differential Δp ($f_{\Delta p}$<5%). The thermal conductivity value $X_\lambda$ specific to the particular measured substance and/or heat capacity value $X_{cp}$, and optionally also the aforementioned flow index n, can, for example, also be correspondingly ascertained in advance and/or with knowledge of the existing measured substance from a specific thermal conductivity value ($X_\lambda$) or heat capacity values ($X_{cp}$), and flow indices (n) can also optionally be read out from a (value) table assigned to a particular measured substance, optionally also recurring, e.g., regularly, and/or due to a change or a replacement of the measured substance in the line.

According to the invention, the density value $X_\rho$, the viscosity value $X_\mu$, the pressure differential value $X_{\Delta p}$, the thermal conductivity value, and the heat capacity value are, further, also used to ascertain at least one characteristic number value $X_V$ for a measured substance characteristic number V which characterizes a heating of the measured substance flowing in the line caused by dissipation—for example, in a partial volume of the flowing measured substance located close to the wall. To process the density value $X_\rho$, the viscosity value $X_\mu$, the pressure differential value $X_{\Delta p}$, thermal conductivity value, and heat capacity value $X_{cp}$, or for calculating the characteristic number value $X_V$, the measuring system can further comprise corresponding (measuring system) electronics 20 which, for example, generate digital measurement values and/or are formed by means of a microprocessor, which can in turn be accommodated in a separate (electronics) protective housing 200, for example. Said (electronics) protective housing 200 can, for example, be designed to be impact and/or explosion resistant, and/or can be configured to protect the (measuring system) electronics from dust and/or splash water. According to a further embodiment of the invention, the (measuring system) electronics 20 are designed in particular to ascertain the at least one measured substance temperature value $X_{TM}$.

The (measuring system) electronics 20 can also have, for example, a non-volatile data memory (EEPROM) for storing digital data, especially also digital (measured) values. In a further embodiment of the invention, said data memory is configured to save the at least one thermal conductivity value $X_\lambda$ and/or the at least one heat capacity value $X_{cp}$. Accordingly, the aforementioned (value) table for specific thermal conductivity values, and/or the specific heat capacity value, and/or the one for flow indices can also be stored in the data memory such that at least one specific thermal conductivity value ($X_\lambda$), and/or at least one particular specific heat capacity value ($X_{cp}$), and/or a particular flow index (n) can be assigned to an entry for a specific measured substance and read out for calculating the characteristic number value $X_V$. Furthermore, the at least one wall temperature value $X_{Tw}$, the at least one density value $X_\rho$, the at least one viscosity value $X_\mu$, and/or the at least one pressure differential value $X_{\Delta p}$ can also be stored in the non-volatile data memory, and/or the at least one characteristic number value $X_V$, and/or the at least one measured substance temperature value $X_{TM}$ can also be (intermediately) saved in the non-volatile data memory. For the aforementioned case in which a temperature sensor 21 is provided for acquiring the wall temperature $T_w$ and for generating the temperature measurement signal θ1 representing it, the (measuring system) electronics 20 can also be electrically connected to the temperature sensor, e.g., by means of an electrical connection line, and the (measuring system) electronics 20 can also be configured to receive and evaluate said temperature measurement signal θ1, e.g., viz., to digitize and/or ascertain the wall temperature value $X_{Tw}$ based upon temperature measurement signal θ1. For the other aforementioned case in which the measuring system is formed by a Coriolis mass flow measuring device, the (measuring system) electronics 20 can, just like the line, also be a component of said Coriolis mass flow measuring device, or, for the cited case in which the measuring system is formed by a pressure differential measuring device, the (measuring system) electronics 20 can also be part of said pressure differential measuring device.

According to the invention, the aforementioned measured substance characteristic number V corresponds to a calculation determined by an Eckert number Ec of the measured substance flowing in the line, a Prandtl number Pr of the measured substance flowing in the line, and a pressure loss coefficient ζ of the line, as well as by a line-specific first exponent a, a line-specific second exponent b, and a line-specific third exponent c:

$$V = f(\Delta p, \rho, \mu, \lambda, c_p) = Pr^a \cdot Ec^b \cdot \zeta^c \quad (4).$$

Typically, the exponent a is more than 0.1 and less than 0.5, especially, viz., 0.3. The exponent b and the exponent c in turn can each be more than 0.8 and less than 1.2, e.g., viz., the same, and/or can each be 1.

Using both the aforementioned wall temperature value $X_{Tw}$ as well as the ascertained characteristic number value $X_V$, at least one measured substance temperature value $X_{TM}$ representing the temperature $T_M$ of the measured substance, e.g., viz., its core temperature, has been ascertained according to the invention; this, for example, such that the measured substance temperature value $X_{TM}$ satisfies the calculation rule depending, inter alia, upon both the characteristic number value $X_V$ as well as the wall temperature value $X_{Tw}$:

$$X_{TM} = X_{TW} - (k1 \cdot X_V + k2) = X_{TW} - X_{\Delta T} \quad (5).$$

The aforementioned calculation rule for the wall temperature value $X_{Tw}$ can further be parameterized by a line-specific first coefficient k1 and a line-specific second coefficient k2. For a particular measuring system, said coefficient k1, k2 can be (calibration) constants ascertained in advance, e.g., over the course of calibration under reference conditions, wherein the coefficient k1 is typically not less than 0.5 K (Kelvin) and not more than 1.5 K, and/or wherein the coefficient k2 is typically not less than −0.2 K and not more than 0.2 K, can also optionally, viz., be set to zero if desired.

According to a further embodiment of the invention, the characteristic number value $X_V$ as well as the line-specific first and second coefficients k1, k2 are dimensioned such that, especially in the case of flowing measured substance and/or in the case in which the measured substance temperature value $X_{TM}$ represents a core temperature of the measured substance, the measured substance temperature value $X_{TM}$ is less than the wall temperature value $X_{Tw}$ ($X_{TM} < X_{Tw}$).

The Prandtl number Pr of the measured substance flowing in the line is a dimensionless parameter for fluids, which is known to be defined as a ratio between viscosity μ and thermal conductivity λ, and therefore corresponds to a calculation formula:

$$Pr = \frac{c_p}{\lambda} \cdot \mu \quad (6)$$

or, when using the effective viscosity, accordingly corresponds to a calculation formula:

$$Pr = \frac{c_p}{\lambda} \cdot K \cdot \dot{\gamma}^{n-1} \cdot \left(\frac{3n+1}{4n}\right)^n \cdot 8^{n-1}. \quad (7)$$

The Eckert number Ec of the measured substance flowing in the line is also a dimensionless parameter for fluids which is defined as a ratio of kinetic energy of the flowing measured substance and an enthalpy difference established between said measured substance and the wall, or corresponds to a calculation formula:

$$Ec = \frac{U^2}{c_p \cdot \Delta T}, \quad (8)$$

wherein, in determining the measured substance temperature $T_M$ according to the invention, the temperature difference ΔT to be used therefor can be easily assumed to be constant, e.g., set to 1 K, so that the Eckert number Ec can also correspond to a simplified calculation formula:

$$Ec = k3 \cdot \frac{U^2}{c_p} \quad (9)$$

for example, with $k3 = 1\ K^{-1}$. Likewise, the aforementioned pressure loss coefficient ζ of the measured substance flowing in the line is also dimensionless. In the present case, this is a measure of a pressure loss in or along the line through which the flow passes, wherein the pressure loss coefficient ζ, occasionally also referred to as the pressure loss or resistance coefficient, corresponds to a calculation formula:

$$\zeta = \frac{\Delta p}{0.5 \cdot \rho \cdot U^2}. \quad (10)$$

Accordingly, the measured substance characteristic number V can also be defined by a calculation formula:

$$V = \left(\frac{c_p}{\lambda} \cdot \mu\right)^a \cdot \left(\frac{U^2}{c_p \cdot \Delta T}\right)^b \cdot \left(\frac{\Delta p}{0.5 \cdot \rho \cdot U^2}\right)^c = \quad (11)$$

$$\left(\frac{c_p}{\lambda} \cdot \mu\right)^a \cdot \left(k3 \cdot \frac{U^2}{c_p}\right)^b \cdot \left(2 \cdot \frac{\Delta p}{\rho \cdot U^2}\right)^c.$$

To determine the characteristic number value $X_V$, according to a further embodiment of the invention, at least one velocity value $X_U$ is also determined, which represents a, for example, average or greatest flow velocity U of the measured substance flowing in the line, and the parameter value $X_V$ is ascertained based upon the aforementioned calculation formula (11), such that the characteristic number value $X_V$ satisfies a calculation rule:

$$X_V = \left(\frac{X_{cp} X_\mu}{X_\lambda}\right)^a \cdot \left(k3 \cdot \frac{X_U^2}{X_{cp}}\right)^b \cdot \left(2 \cdot \frac{X_{\Delta p}}{X_\rho \cdot X_U^2}\right)^c \quad (12)$$

wherein a line-specific third coefficient k3 corresponds with the aforementioned temperature difference ΔT ($k3 = \Delta T^{-1} = k_{Ec}$).

For the aforementioned typical case in which the exponent b can be set to be equal to the exponent c, the measured substance key value V accordingly also corresponds to a calculation formula which is simplified in comparison to the calculation formula (11), especially, viz., independent of the flow velocity U:

$$V = \left(\frac{c_p}{\lambda} \cdot \mu\right)^a \cdot \left(k3 \cdot \frac{\Delta p}{0.5 \cdot \rho \cdot c_p}\right)^b, \quad (13)$$

for example, viz., also corresponds to a further simplified calculation formula:

$$V = \left(\frac{c_p}{\lambda} \cdot \mu\right)^a \cdot k3 \cdot \frac{\Delta p}{0.5 \cdot \rho \cdot c_p}, \quad (14)$$

or the measured substance characteristic number V can be defined by one of the simplified calculation formulas (13) or (14). Based upon this, the characteristic number value $X_V$ can therefore also be ascertained such that it satisfies a calculation rule which is simpler in comparison with the aforementioned calculation rule (12):

$$X_V = \left(\frac{X_{cp}}{X_\lambda} \cdot X_\mu\right)^a \cdot \left(k3 \cdot \frac{2 \cdot X_{\Delta p}}{X_\rho \cdot X_{cp}}\right)^b \quad (15)$$

or $$X_V = \left(\frac{X_{cp}}{X_\lambda} \cdot X_\mu\right)^a \cdot k3 \cdot \frac{2 \cdot X_{\Delta p}}{X_\rho \cdot X_{cp}}, \quad (16)$$

for example, viz., $$X_V = \left(\frac{X_{cp}}{X_\lambda} \cdot X_\mu\right)^{0.3} \cdot k3 \cdot \frac{2 \cdot X_{\Delta p}}{X_\rho \cdot X_{cp}}. \quad (17)$$

Figure 4:
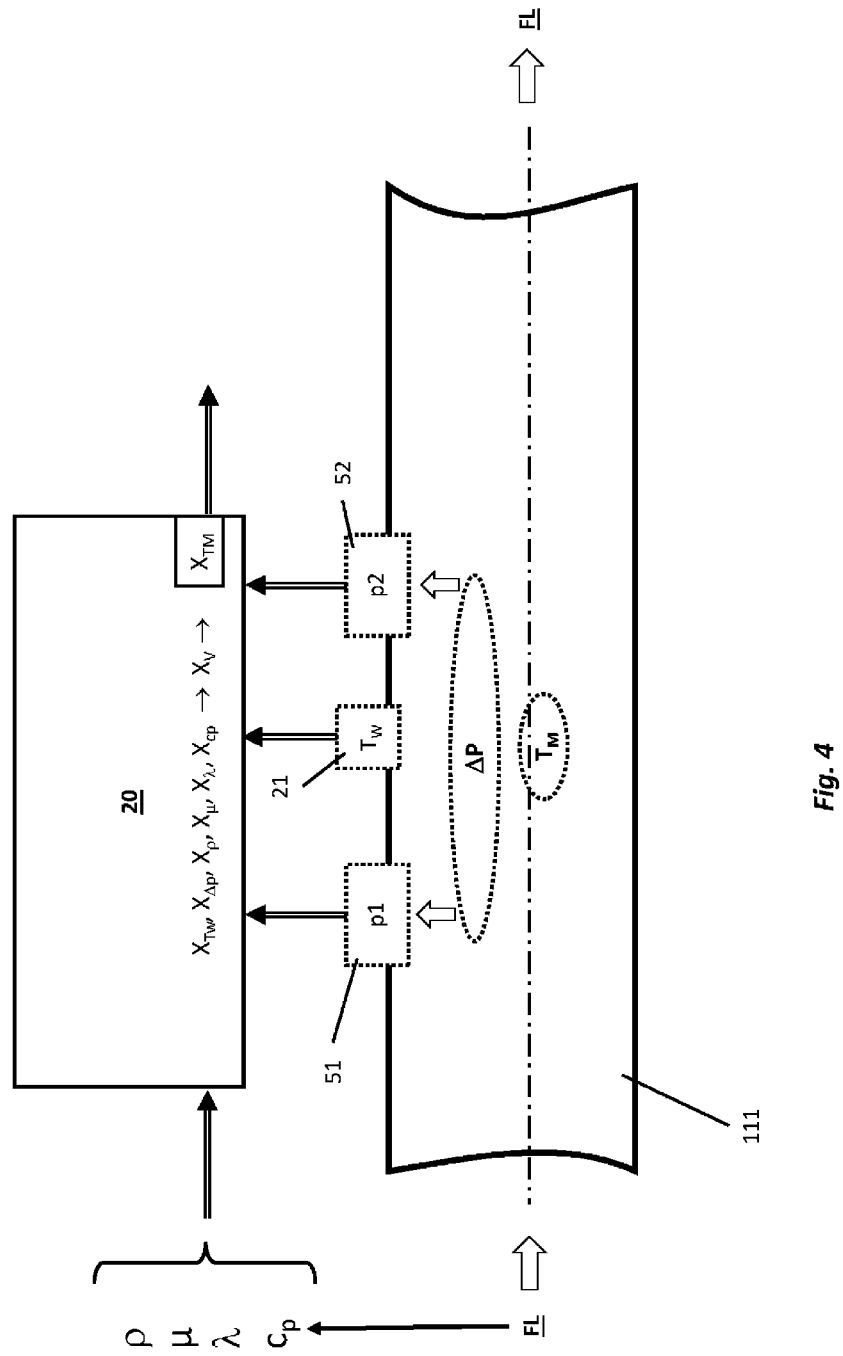
FIG. 4 schematically shows an additional variant of a measuring device according to the present disclosure.

According to a further embodiment of the invention, it is further provided that a first static pressure p1 established in the measured substance FL flowing in the line 111 and a second static pressure p2 established in the flow direction downstream thereof in the flowing measured substance be ascertained, and in addition at least the pressure differential value $X_{\Delta p}$, e.g., also the viscosity value $X_\mu$ and/or the aforementioned velocity value $X_U$, be ascertained on the basis of the detected first and second static pressures. The first and second static pressures p1, p2 or the pressure differential $\Delta p$ ($\Delta p = p1 - p2$), as is also indicated in FIG. 4, can be ascertained, for example, by means of two pressure sensors 51, 52, which are spaced apart from one another in the flow direction in the wall of the line and which, for example, can be electrically connected to the aforementioned (measuring system) electronics 20, and/or can also be part of the aforementioned pressure differential measuring device. Accordingly, the (measuring system) electronics 20 can furthermore also be configured to ascertain the pressure differential value $X_{\Delta p}$, e.g., also the viscosity value $X_\mu$ and/or the aforementioned velocity value $X_U$, by using pressure measurement signals generated by means of the aforementioned pressure sensors, perhaps also digital ones.

As mentioned, inter alia, in the above-mentioned U.S. Pat. Nos. 8,757,007B, 8,671,776B, or 8,924,165B, the aforementioned pressure loss coefficient $\zeta$ of the measured substance flowing in the line can also correspond to a calculation formula:

$$\zeta = k41 + k42 \cdot Re^{k43} \tag{18},$$

or the pressure differential $\Delta p$ also corresponds to a calculation formula:

$$\Delta p = \left(k41 + k42 \cdot Re^{k43}\right)^{k52} \cdot k51 \cdot \frac{\dot{m}^2}{\rho} \tag{19}$$

or, taking into account the aforementioned calculation formula (1), for example, also corresponds to a calculation formula:

$$\Delta p = \left[k41 + k42 \cdot \left(\frac{\dot{m}}{A \cdot \mu}\right)^{k43}\right]^{k52} \cdot k51 \cdot \frac{\dot{m}^2}{\rho}. \tag{20}$$

Furthermore, the pressure differential value $X_{\Delta p}$ can be ascertained based upon the mass flow $\dot{m}$, the density $\rho$, as well as the viscosity $\mu$ and/or the Reynolds number Re of the flowing measured substance, or the measured substance characteristic number V can therefore also be defined by a calculation formula:

$$V = \left(\frac{c_p}{\lambda} \cdot \mu\right)^a \cdot \left(k_{Ec} \cdot \frac{U^2}{c_p}\right)^b \cdot \left(\frac{2}{\rho \cdot U^2} \cdot \left[k41 + k42 \cdot \left(\frac{\dot{m}}{A \cdot \mu}\right)^{k43}\right]^{k52} \cdot k51 \cdot \frac{\dot{m}^2}{\rho}\right)^c \tag{21}$$

or, with the same exponents b and c, can also be defined by a calculation formula:

$$V = \left(\frac{c_p}{\lambda} \cdot \mu\right)^a \cdot \left(\frac{2 \cdot k_{Ec}}{\rho \cdot c_p} \cdot \left[k41 + k42 \left(\frac{\dot{m}}{A \cdot \mu}\right)^{k43}\right]^{k52} \cdot k51 \cdot \frac{\dot{m}^2}{\rho}\right)^b. \tag{22}$$

As a result, both the pressure loss coefficient $\zeta$ as well as the pressure differential $\Delta p$ can therefore also be ascertained on the basis of such measured variables, which, for example, can also be measured by means of a vibronic measuring system—for example, viz., also a (conventional) Coriolis mass flow measuring device.

Accordingly, according to another embodiment of the invention, it is further provided that at least one mass flow value $X_{\dot{m}}$ representing the mass flow $\dot{m}$ of the measured substance flowing in the line, and/or at least one Reynolds number value $X_{Re}$ representing the Reynolds number Re of the measured substance flowing in the line be ascertained. The Reynolds number value $X_{Re}$ can, according to the calculation formula (1), be ascertained, for example, such that it satisfies a calculation rule:

$$X_{Re} = k61 \cdot \frac{X_\rho \cdot X_U}{X_\mu} \tag{23}$$

or a calculation formula:

$$X_{Re} = k62 \cdot \frac{X_{\dot{m}}}{X_\mu} \tag{24}$$

wherein the coefficient k61 corresponds with the aforementioned characteristic length L, or the coefficient k62 corresponds with the aforementioned characteristic length A. Using the at least one Reynolds number value $X_{Re}$ as well as the aforementioned mass flow value $X_{\dot{m}}$ together with the density value $X_\rho$, both the pressure loss coefficient value $X_\zeta$ as well as the pressure differential value $X_{\Delta p}$ can then be calculated, for example, such that the pressure loss coefficient value $X_\zeta$ satisfies a calculation rule:

$$X_\zeta = k41 + k42 \cdot X_{Re}^{k43} \tag{25}$$

and/or the pressure differential value $X_{\Delta p}$ satisfies a calculation rule:

$$X_{\Delta p} = k51 \cdot \frac{X_{\dot{m}}^2}{X_\rho} \cdot \left(k41 + k42 \cdot X_{Re}^{k43}\right)^{k52}. \tag{26}$$

If necessary, the velocity value $X_U$ can also be ascertained based upon the calculation rule using the at least one mass flow value $X_{\dot{m}}$ and the at least one density value $X_\rho$:

$$X_U = k7 \cdot \frac{X_{\dot{m}}}{X_\rho}. \tag{27}$$

The aforementioned coefficients k41, k42, k43, k51, k52, k61, k62, and k7 are in each case likewise line-specific or measuring system-specific (calibration) constants which, just like the aforementioned coefficients k1, k2, can be ascertained in advance for a particular measuring system, e.g., by calibrating the measuring system under reference conditions, e.g., viz., over the course of a calibration of the measuring system at the manufacturer and/or a (re-) calibration of the measuring system on-site.

According to a further embodiment of the invention, it is further provided that the line for ascertaining the density value $X_\rho$, and/or for ascertaining the viscosity value $X_\mu$, and/or for ascertaining the pressure differential value $X_{\Delta p}$, and/or the aforementioned mass flow value and/or the pre-designated Reynolds number value $X_{Re}$ be made to vibrate; this, for example, such that the line 111 is actively excited to useful vibrations, viz., mechanical vibrations about an associated static rest position with at least one vibration frequency which corresponds to or deviates only slightly from a resonance frequency which is immanent for the line—for example, also, viz., dependent upon the density ρ of the measured material FL flowing in the line 111. The active excitation of mechanical vibrations of the line 111, and therefore the excitation of the useful vibrations, can take place, as is also shown in FIG. 3, e.g., by means of at least one electromechanical vibration exciter 31 acting on the line 111 and designed to convert electrical power into a mechanical drive force acting in a vibration of the line 111, and to introduce said drive force into the line 111 and/or which, in the aforementioned case that the measuring system is formed by means of a Coriolis mass flow meter, can be a component of the said Coriolis mass flow meter just like the line 111. Alternatively or in addition, the at least one vibration exciter 31 can further be electrically connected to the aforementioned (measuring system) electronics 20, e.g., by means of an electrical connection line, and the (measuring system) electronics can be configured to feed the electrical power required to cause mechanical oscillations of the line into the vibration exciter 31 by means of an electrical excitation signal e1. Furthermore, it is also provided that the aforementioned mechanical vibrations of the line be detected and, as indicated in FIG. 3, converted into vibration signals s1, s2, e.g., viz., the electrical vibration measurement signal representing vibration movements of the line, with in each case an electrical signal voltage dependent upon a velocity of the vibration movements of the line; and this in particular in such a way that, between the vibration signals s1, s2, a phase difference which is dependent upon the mass flow ṁ of the measured substance FL flowing in the line 111 is established, and/or that each of the vibration signals s1, s2 has a signal frequency which is dependent upon the density ρ of the measured substance FL flowing in the line 111. According to a further embodiment of the invention, mechanical vibrations of the line, in particular, viz., the aforementioned useful vibrations, are detected, and said vibrations are converted into corresponding vibration signals, by means of two vibration sensors 41, 42, e.g., electrodynamic or optical, arranged at a distance from each other in the direction of flow, respectively on the line or in its vicinity, which, in the aforementioned case in which the measuring system is formed by means of a Coriolis mass flow measuring device, can, like the line, also be, for example, part of said the Coriolis mass flow measuring device. Alternatively or in addition, the vibration sensors can further be electrically connected to the aforementioned (measuring system) electronics 20, e.g., by means of an electrical connection line, and the (measuring system) electronics 20 can be configured to receive and evaluate the vibration signals of the vibration sensors 41, 42, e.g., viz., to digitize and/or ascertain the density value $X_\rho$, and/or the viscosity value $X_\mu$, and/or the pressure differential value $X_{\Delta p}$, and/or the aforementioned mass flow value $X_{\dot{m}}$, and/or the aforementioned Reynolds number value $X_{Re}$ on the basis of the vibration signals s1, s2, or on the basis of the vibration signals s1, s2 along with the aforementioned electrical excitation signal.

As already mentioned, a particular objective of the invention is, inter alia, also that—or the measuring system according to the invention is so suited that—greater measurement accuracy can be achieved in comparison with conventional measuring systems or measuring methods with regard to ascertaining the measured substance temperature $T_M$; and this in particular also such that a measured substance temperature value $X_{TM}$ ascertained according to the invention deviates from the actual or true measured substance temperature $T_M$ by less than 3 K, especially less than 1 K, not least in the case in which said measured substance temperature value $X_{TM}$ represents the core temperature. The method according to the invention also has, inter alia, the advantage that the desired high measurement accuracy in ascertaining the measured substance temperature $T_M$ can also be achieved if the density value $X_\rho$ deviates from the (true or actual) density ρ of the measured substance by not more than 0.5% of the density ρ ($f_\rho$<0.5%) and/or if the pressure differential value $X_{\Delta p}$ deviates from the (true or actual) pressure differential Δp by not more than 15% of the pressure differential Δp ($f_{\Delta p}$<15%), and/or if the viscosity value $X_\mu$ deviates from the (true or actual) viscosity μ of the measured substance by not more than 15% of the viscosity μ ($f_\mu$<15%), and/or if the thermal conductivity value $X_\lambda$ deviates from the (true or actual) thermal conductivity λ of the measured substance by not more than 50% of the thermal conductivity λ ($f_\lambda$<50%), and/or if the heat capacity value $X_{cp}$ deviates from the (true or actual) specific heat capacity $c_p$ of the measured substance by no more than 50% of the specific heat capacity $c_p$ ($f_{cp}$<50%); and this in particular also in the case in which the density value $X_\rho$ deviates from the (true or actual) density ρ of the measured substance by more than 0.1% of density ρ ($f_\rho$>0.1%), and/or the viscosity value $X_\mu$ deviates from the (true or actual) viscosity μ of the measured substance by more than 2% of the viscosity μ ($f_\mu$>2%), and/or the pressure differential value $X_{\Delta p}$ deviates from the (true or actual) pressure differential Δp by more than 5% of the pressure differential Δp ($f_{\Delta p}$>5%), and/or the thermal conductivity value $X_\lambda$ deviates from the (true or actual) thermal conductivity λ of the measured substance by more than 5% of the thermal conductivity λ ($f_\lambda$>5%), and/or the heat capacity value $X_{cp}$ deviates from the (true or actual) specific heat capacity $c_p$ of the measured substance by more than 5% of the specific heat capacity $c_p$ ($f_{cp}$>5%). In ascertaining the measured substance temperature $T_M$ according to the invention, it can also be advantageous in this case, and not least also in the case in which the aforementioned core temperature is at issue, for the specific heat capacity $c_p$ to be no more than 5 kJ·kg$^{-1}$·K$^{-1}$, and/or the thermal conductivity λ of the measured substance to be no more than 1 W·m$^{-1}$·K$^{-1}$, and/or the density ρ of the measured substance to be less than 2,000 kg·m$^{-3}$.

The invention claimed is:
1. A method for determining a temperature of a medium conducted in a line, wherein the line includes a lumen enclosed by a wall, the method comprising:
   flowing the medium through the line in a predetermined flow direction;
   measuring a wall temperature value ($X_{TW}$) representing a temperature of the wall;
   determining a density value ($X_\rho$) representing a density of the medium flowing in the line;
   determining a viscosity value ($X_\mu$) representing a viscosity of the medium flowing in the line;
   determining a thermal conductivity value ($X_\lambda$) representing a thermal conductivity of the medium;
   determining a heat capacity value ($X_{cp}$) representing a specific heat capacity of the medium;
   determining a pressure differential value ($X_{\Delta p}$) representing a pressure differential established in the medium flowing in the line in the flow direction, wherein the pressure differential is between a first static pressure in the flowing medium and a second static pressure in the flowing medium established downstream of the first static pressure;

calculating a characteristic number value ($X_V$) for a medium characteristic number (V) that characterizes heating of the medium flowing in the line caused by dissipation using the density value, the viscosity value, the pressure differential value, the thermal conductivity value and the heat capacity value, wherein the medium characteristic number is defined by an Eckert number (Ec) of the medium flowing in the line, a Prandtl number (Pr) of the medium flowing in the line, a pressure loss coefficient ($\zeta$) of the line, a line-specific first exponent (a), a line-specific second exponent (b), and a line-specific third exponent (c), as:

$$V = f(\Delta p, \rho, \mu, \lambda, c_p) = Pr^a \cdot Ec^b \cdot \zeta^c; \text{ and}$$

determining a medium temperature value ($X_{TM}$) representing the temperature of the medium using the characteristic number value and the wall temperature value such that the medium temperature value satisfies a calculation rule.

2. The method of claim 1, wherein the calculation rule that the medium temperature value satisfies depends on the characteristic number value and the wall temperature value, as parameterized by a line-specific first coefficient and a line-specific second coefficient, as:

$$X_{TM} = X_{TW} - (k1 \cdot X_V + k2) = X_{TW} - X_{\Delta T},$$

wherein k1 is the line-specific first coefficient, k2 is the line-specific second coefficient, and $X_{\Delta T}$ is a temperature difference between the medium temperature and the temperature of the wall.

3. The method of claim 2, wherein at least one of:
the first coefficient and the second coefficient are predetermined calibration constants;
the first coefficient is not less than 0.5 Kelvin (K) and not more than 1.5 K; and
the second coefficient is not less than −0.2 K and not more than 0.2 K.

4. The method of claim 1, wherein at least one of:
the first exponent is more than 0.1 and less than 0.5;
the second exponent is more than 0.8 and less than 1.2; and
the third exponent is more than 0.8 and less than 1.2.

5. The method of claim 1, wherein the second exponent is equal to the third exponent.

6. The method of claim 1, wherein the characteristic number value satisfies a calculation formula:

$$X_V = \left(\frac{X_{cp}}{X_\lambda} \cdot X_\mu\right)^a \cdot \left(k3 \cdot \frac{2 \cdot X_{\Delta p}}{X_\rho \cdot X_{cp}}\right)^b,$$

wherein k3 is a line-specific third coefficient corresponding to a temperature difference between the medium temperature and the temperature of the wall.

7. The method of claim 6, wherein the second exponent is equal to one.

8. The method of claim 1, wherein at least one of:
the specific heat capacity of the medium is not less than 1 kJ·kg$^{-1}$·K$^{-1}$ and no more than kJ·kg$^{-1}$·K$^{-1}$;
the thermal conductivity of the medium is not less than 0.1 W·m$^{-1}$·K$^{-1}$ and not more than 1 W·m$^{-1}$·K$^{-1}$;
the viscosity of the medium is greater than 1 mPa·s;
the density of the medium is greater than 500 kg·m$^{-3}$ and/or less than 2000 kg·m$^{-3}$;
the medium flowing in the line has a mean or greatest flow velocity that is greater than 0.1 m·s$^{-1}$;
the medium flowing in the line has a mass flow rate greater than 0.01 kg·s$^{-1}$; and
the medium flowing in the line has a Reynolds number greater than 100.

9. The method of claim 1, further comprising:
determining a Reynolds number value representing a Reynolds number of the medium flowing in the line.

10. The method of claim 9, wherein the pressure loss coefficient value ($X_\zeta$) satisfies a calculation rule:

$$X_\zeta = k41 + k42 \cdot X_{Re}^{k43},$$

wherein k41, k42 and k43 are calibration coefficients.

11. The method of claim 9, wherein the Reynolds number value satisfies a calculation rule:

$$X_{Re} = k61 \cdot \frac{X_\rho \cdot X_U}{X_\mu},$$

wherein $X_U$ is a velocity value representing a mean or greatest flow velocity of the medium flowing in the line, and k61 is a calibration coefficient.

12. The method of claim 1, further comprising:
determining a mass flow rate value ($X_{\dot{m}}$) representing a mass flow of the medium flowing in the line.

13. The method of claim 12, further comprising:
determining a Reynolds number value ($X_{Re}$) representing a Reynolds number of the medium flowing in the line, wherein the pressure differential value satisfies a calculation rule:

$$X_{\Delta p} = k51 \cdot \frac{X_{\dot{m}}^2}{X_\rho} \cdot \left(k41 + k42 \cdot X_{Re}^{k43}\right)^{k52},$$

and/or
wherein the Reynolds number value satisfies a calculation rule:

$$X_{Re} = k62 \cdot \frac{X_{\dot{m}}}{X_\mu},$$

wherein k41, k42, k43, k51, k52 and k62 are calibration coefficients.

14. The method according to claim 12, wherein the velocity value ($X_U$) satisfies a calculation rule:

$$X_U = k7 \cdot \frac{X_{\dot{m}}}{X_\rho}.$$

15. The method of claim 1, further comprising:
determining a velocity value representing a mean or greatest flow velocity of the medium flowing in the line.

16. The method of claim 15, wherein the pressure loss coefficient value satisfies a calculation rule:

$$X_\zeta = \frac{X_{\Delta p}}{0.5 \cdot X_\rho \cdot X_U^2},$$

and/or wherein the characteristic number value satisfies a calculation rule:

$$X_V = \left(\frac{X_{cp} \cdot X_\mu}{X_\lambda}\right)^a \cdot \left(k3 \cdot \frac{X_U^2}{X_{cp}}\right)^b \cdot \left(2 \cdot \frac{X_{\Delta p}}{X_\rho \cdot X_U^2}\right)^c,$$

wherein $X_U$ is the velocity value.

17. The method according to claim 1, wherein at least one of:
- the density value deviates from the density of the medium by not more than 0.5% of the density;
- the pressure differential value deviates from the pressure differential by not more than 15% of the pressure differential;
- the viscosity value deviates from the viscosity of the medium by not more than 15% of the viscosity;
- the thermal conductivity value deviates from the thermal conductivity of the medium by not more than 50% of the thermal conductivity; and
- the heat capacity value deviates from the specific heat capacity of the medium by no more than 50% of the specific heat capacity.

18. The method according to claim 1, wherein the medium temperature value deviates from the medium temperature by less than 2 K.

19. The method according to claim 1, wherein at least one of:
- the wall temperature is greater than the temperature of the medium;
- the medium temperature value is less than the wall temperature value; and
- the medium temperature value represents a core temperature of the medium.

20. The method according to claim 1, wherein at least one of:
- the wall temperature value represents a surface temperature of a hollow cylindrical segment of the wall; and
- to determine the wall temperature value, a surface temperature of the wall on a hollow cylindrical segment of the wall is determined.

21. The method according to claim 1, further comprising: determining a flow index of the medium flowing in the line.

22. The method according to claim 1, wherein at least one of:
- the wall of the line comprises a steel, a titanium alloy, a tantalum alloy or a zirconium alloy; and
- the wall of the line has a wall thickness which is not less than 0.5 mm and/or no more than 5 mm.

23. The method according to claim 1, wherein the line for determining at least one of the density value, the viscosity value and the pressure differential value is excited to mechanically vibrate by an electromechanical vibration exciter of a Coriolis mass flow measuring device.

24. The method according to claim 1, further comprising: using a Coriolis mass flow measuring device to determine at least one of the density value, the viscosity value and the pressure differential value.

25. The method according to claim 1, wherein the line is a component of a Coriolis mass flow measuring device.

26. The method according to claim 1, further comprising: using a pressure differential measuring device to determine the pressure differential value.

27. The method according to claim 26, wherein the line is a component of the pressure differential measuring device.

28. The method according to claim 1, further comprising: determining the first static pressure established in the flowing medium and the second static pressure established in the flow direction downstream thereof in the flowing medium; and
determining the pressure differential value based upon the determined first and second static pressures.

29. The method according to claim 1, further comprising: determining a surface temperature of a hollow cylindrical segment of the wall as the temperature of the wall; and
generating a temperature measurement signal that follows a change of the temperature of the wall with a change of at least one signal parameter.

30. The method according to claim 29, further comprising at least one of:
generating the temperature measuring signal using a temperature sensor thermally coupled to a lateral surface of the wall; and
determining the wall temperature value using the temperature measurement signal.

31. A measuring system configured to perform the method according to claim 30, the measuring system comprising:
measuring and operating electronics electrically connected to the temperature sensor; and
at least one microprocessor,
wherein the measuring system is a vibronic measuring system.

32. The measuring system of claim 31, wherein the measuring and operating electronics are configured to determine the medium temperature value.

33. The measuring system of claim 32, wherein at least one of:
the measuring and operating electronics are configured to determine the wall temperature value; and
the measuring and operating electronics are configured to determine the characteristic number value of the medium characteristic number.

34. The measuring system of claim 31, further comprising:
a vibration exciter configured to excite mechanical vibrations in the line; and
first and second vibration sensors configured to register the mechanical vibrations of the line and to convert the mechanical vibrations into first or second vibration signals.

35. The measuring system of claim 34,
wherein both the vibration exciter and the first and second vibration sensors are electrically connected to the measuring system electronics, and
wherein the measuring system electronics are configured to:
operate upon an electrical excitation signal to feed electrical power to the vibration exciter, thereby causing the mechanical vibrations of the line; and
receive and evaluate the first and second vibration signals of the first and second vibration sensors to digitize and determine at least one of the density value, the viscosity value, and the pressure differential value, a mass flow value and a Reynolds number value based on the first and second vibration signals vibration signals or based on the first and second vibration signals and the electrical excitation signal.

36. The measuring system of claim 31, further comprising:
first and second pressure sensors configured and arranged to determine the pressure differential, which first and second pressure sensors are introduced in the wall of the line at a separation distance from each other in the flow direction.

37. The measuring system of claim 36, wherein both the first pressure sensor and the second are electrically connected to the measuring system electronics, and wherein the measuring system electronics are configured to determine at least one of the pressure differential value, the viscosity value and the velocity value using pressure measurement signals generated by the first and second pressure sensors.

* * * * *